United States Patent
Bergeal et al.

(10) Patent No.: US 11,359,530 B2
(45) Date of Patent: Jun. 14, 2022

(54) EXHAUST SYSTEM COMPRISING A PASSIVE $NO_x$ ADSORBER

(71) Applicant: Johnson Matthey Public Limited Company, London (GB)

(72) Inventors: David Bergeal, Royston (GB); Gavin Brown, Royston (GB); Andrew Francis Chiffey, Royston (GB); Francois Moreau, Royston (GB); Matthew O'Brien, Royston (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 15/285,579

(22) Filed: Oct. 5, 2016

(65) Prior Publication Data

US 2017/0096922 A1    Apr. 6, 2017

(30) Foreign Application Priority Data

Oct. 6, 2015   (GB) .................................... 1517580

(51) Int. Cl.
*F01N 3/08*      (2006.01)
*F01N 3/20*      (2006.01)
(Continued)

(52) U.S. Cl.
CPC ......... *F01N 3/0814* (2013.01); *F01N 3/0807* (2013.01); *F01N 3/0842* (2013.01);
(Continued)

(58) Field of Classification Search
CPC .... F01N 13/009; F01N 3/0807; F01N 3/0814; F01N 3/0842; F01N 3/2066;
(Continued)

(56) References Cited

U.S. PATENT DOCUMENTS 4,300,956 A    11/1981   Rosenberger et al.
5,146,743 A    9/1992    Maus et al.
(Continued)

FOREIGN PATENT DOCUMENTS

DE    19503522 A1    8/1996
DE    102014118092 A1    6/2015
(Continued)

OTHER PUBLICATIONS

Ishibashi et al. , JP 403026343, Feb. 1991, machine translation.*

*Primary Examiner* — Phutthiwat Wongwian
*Assistant Examiner* — Diem T Tran (57) ABSTRACT

An exhaust system for treating an exhaust gas produced by a lean burn engine comprising: (i) a $NO_x$ absorber catalyst comprising a molecular sieve catalyst disposed on a substrate, wherein the molecular sieve catalyst comprises a noble metal and a molecular sieve, wherein the molecular sieve contains the noble metal; (ii) means for introducing hydrocarbons into the exhaust gas; and (iii) a lean $NO_x$ trap; wherein the $NO_x$ absorber catalyst is upstream of both the means for introducing hydrocarbons into the exhaust gas and the lean $NO_x$ trap.

16 Claims, 2 Drawing Sheets

(51) Int. Cl.
    *F01N 13/00*  (2010.01)
    *F01N 3/28*  (2006.01)

(52) U.S. Cl.
    CPC ......... *F01N 3/2066* (2013.01); *F01N 3/2807* (2013.01); *F01N 13/009* (2014.06); *F01N 2250/12* (2013.01); *F01N 2610/03* (2013.01); *Y02A 50/20* (2018.01); *Y02T 10/12* (2013.01)

(58) Field of Classification Search
    CPC .............. F01N 3/2807; F01N 2250/12; F01N 2610/03; Y02A 50/20; Y02T 10/12
    USPC ................................... 60/286, 295, 297, 301
    See application file for complete search history.

(56) References Cited

U.S. PATENT DOCUMENTS

| | | | |
|---|---|---|---|
| 6,182,443 B1 | 2/2001 | Jarvis et al. | |
| 6,217,837 B1 | 4/2001 | Narula et al. | |
| 6,513,324 B2 | 2/2003 | Bruck et al. | |
| 7,213,395 B2* | 5/2007 | Hu | B01D 53/9481 423/239.1 |
| 7,565,799 B2* | 7/2009 | Brown | F01N 3/0871 60/274 |
| 7,930,881 B2* | 4/2011 | Goersmann | B01D 53/9422 60/274 |
| 8,058,205 B2* | 11/2011 | Nagaoka | B01D 53/9431 422/170 |
| 8,635,855 B2* | 1/2014 | Mital | F01N 3/035 60/274 |
| 9,540,985 B2* | 1/2017 | Harmsen | F01N 3/0821 |
| 9,567,888 B2* | 2/2017 | Gupta | F01N 3/208 |
| 9,616,420 B2* | 4/2017 | Chandler | B01J 29/76 |
| 9,662,611 B2* | 5/2017 | Wan | B01D 53/9431 |
| 10,005,075 B2 | 6/2018 | Rajaram et al. | |
| 2005/0247049 A1* | 11/2005 | Kaboord | F01N 3/2013 60/286 |
| 2006/0042235 A1* | 3/2006 | Kaboord | F01N 3/0814 60/286 |
| 2006/0248874 A1* | 11/2006 | Goersmann | B01D 53/9422 60/274 |
| 2011/0214412 A1 | 9/2011 | Chiffey et al. | |
| 2012/0117948 A1 | 5/2012 | Aslam | |
| 2015/0158019 A1* | 6/2015 | Rajaram | B01D 53/9481 423/213.2 |
| 2015/0273452 A1 | 10/2015 | Chiffey et al. | |

FOREIGN PATENT DOCUMENTS

| | | | |
|---|---|---|---|
| EP | 1027919 | A2 | 8/2000 |
| FR | 3007793 | A1 | 1/2015 |
| JP | 40302634 | * | 2/1991 |
| JP | 2000230414 | A | 8/2000 |
| WO | 199947260 | A1 | 9/1999 |
| WO | 2006008625 | A1 | 1/2006 |
| WO | 2007077462 | A1 | 7/2007 |
| WO | 2011080525 | A1 | 7/2011 |
| WO | 2012166868 | A1 | 12/2012 |
| WO | 2014195685 | A1 | 12/2014 |

* cited by examiner

Figure 1

EXHAUST SYSTEM COMPRISING A PASSIVE NO$_x$ ADSORBER

CROSS-REFERENCE TO RELATED APPLICATIONS

This application claims priority benefit of GB Patent Application No. 1517580.5, filed Oct. 6, 2015, the disclosure of which is incorporated herein by reference in its entireties for all purposes.

FIELD OF THE INVENTION

The invention relates to an exhaust system for a lean burn engine. The invention also relates to a method of using the exhaust system to treat an exhaust gas produced by a lean burn engine.

BACKGROUND TO THE INVENTION

Lean burn engines, such as diesel engines, produce an exhaust emission that generally contains at least four classes of pollutant that are legislated against by inter-governmental organisations throughout the world: carbon monoxide (CO), unburned hydrocarbons (HCs), oxides of nitrogen (NO$_x$) and particulate matter (PM).

A variety of emissions control devices exist for the treatment of oxides of nitrogen (NO$_x$). These devices include, for example, a selective catalytic reduction (SCR) catalyst, a selective catalytic reduction filter (SCRF™) catalyst, a lean NO$_x$ catalyst [e.g. hydrocarbon (HC) SCR catalyst], a lean NO$_x$ trap (LNT) [also known as a NO$_x$ storage catalyst (NSC)] and a passive NO$_x$ adsorber (PNA).

SCR catalysts or SCRF™ catalysts typically achieve high efficiencies for treating NO$_x$ by reduction once they have reached their effective operating temperature. However, these catalysts or devices can be relatively inefficient below their effective operating temperature, such as when the engine has been started from cold (the "cold start" period) or has been idling for a prolonged period.

Another common type of emissions control device for reducing or preventing the emission of NO$_x$ is a lean NO$_x$ trap (LNT). During normal operation, a lean burn engine produces an exhaust emission having a "lean" composition. An LNT is able to store or trap the nitrogen oxides (NO$_x$) that are present in the "lean" exhaust emission. The LNT stores or traps the NO$_x$ present in the exhaust emission by a chemical reaction between the NO$_x$ and a NO$_x$ storage component of the LNT to form an inorganic nitrate. The amount of NO$_x$ that can be stored by the LNT is limited by the amount of NO$_x$ storage component that is present. Eventually, it will be necessary to release the stored NO$_x$ from the NO$_x$ storage component of the LNT, ideally when a downstream SCR or SCRF™ catalyst has reached its effective operating temperature. Release of stored NO$_x$ from an LNT is typically achieved by running the lean burn engine under rich conditions to produce an exhaust emission having a "rich" composition. Under these conditions, the inorganic nitrates of the NO$_x$ storage component decompose to reform NO$_x$. The step of releasing stored NO$_x$ from an LNT under rich exhaust gas conditions is known as purging or regenerating the LNT. A disadvantage of LNTs is that they tend to show poor NO$_x$ storage efficiency at low temperatures.

A relatively new type of emissions control device for NO$_x$ is a passive NO$_x$ adsorber (PNA). PNAs are able to store or adsorb NO$_x$ at relatively low exhaust gas temperatures (e.g. less than 200° C.), usually by adsorption, and release NO$_x$ at higher temperatures. The NO$_x$ storage and release mechanism of PNAs is thermally controlled, unlike that of LNTs which require a rich purge to release stored NO$_x$.

SUMMARY OF THE INVENTION

The invention relates to an exhaust system comprising a specific type of passive NO$_x$ adsorber (PNA), namely a passive NO$_x$ adsorber (PNA) comprising a molecular sieve catalyst. It has been found that this type of PNA is able to store NO$_x$ at a low temperature, typically at a temperature that is much lower than the NO$_x$ storage temperature of a LNT. Such low temperature NO$_x$ storage is advantageous when a lean burn engine has been started from cold (the "cold start" period) or has been idling for a prolonged period. By including both a PNA and a LNT in an exhaust system, it is possible to store NO$_x$ over a broader temperature window.

However, it has been discovered that the NO$_x$ storage activity of a PNA comprising a molecular sieve catalyst can be destroyed when the PNA is exposed to a rich exhaust gas composition. The rich purge that is used to bring about the release of NO$_x$ from the LNT may destroy the NO$_x$ storage activity of the PNA. The invention is based on the recognition of this problem and provides a solution thereto.

The invention provides an exhaust system for treating an exhaust gas produced by a lean burn engine. The exhaust system comprises:
  (i) a NO$_x$ absorber catalyst comprising a molecular sieve catalyst disposed on a substrate, wherein the molecular sieve catalyst comprises a noble metal and a molecular sieve, wherein the molecular sieve contains the noble metal;
  (ii) means for introducing hydrocarbons into the exhaust gas; and
  (iii) a lean NO$_x$ trap;
  wherein the NO$_x$ absorber catalyst is upstream of both the means for introducing hydrocarbons into the exhaust gas and the lean NO$_x$ trap.

The invention further provides a vehicle. The vehicle comprises a lean burn engine and the exhaust system of the invention.

The invention also relates to a method of treating an exhaust gas from a lean burn engine. Typically, the method involves passing an exhaust gas produced by a lean burn engine through an exhaust system of the invention.

Additionally or alternatively, the method of the invention comprises:
  (a) contacting an exhaust gas produced by the lean burn engine with a NO$_x$ absorber catalyst comprising a molecular sieve catalyst disposed on a substrate, wherein the molecular sieve catalyst comprises a noble metal and a molecular sieve, wherein the molecular sieve contains the noble metal;
  (b) contacting the exhaust gas from the NO$_x$ absorber catalyst with a lean NO$_x$ trap; and
  (c) periodically regenerating the lean NO$_x$ trap by introducing hydrocarbons into the exhaust gas after or from the NO$_x$ absorber catalyst.

BRIEF DESCRIPTION OF THE DRAWINGS

FIG. 1 shows an exhaust system comprising a $NO_x$ absorber catalyst (10), an injector (20) and a lean $NO_x$ trap (30). Exhaust gas (1) produced by a lean burn engine is contacted with the $NO_x$ absorber catalyst (10). The exhaust gas (2) from the $NO_x$ absorber catalyst (10) is contacted with the lean $NO_x$ trap (30). The injector (20) may introduce hydrocarbons into the exhaust gas (2) after it has passed through the $NO_x$ absorber catalyst (10).

FIG. 2 shows an exhaust system comprising a $NO_x$ absorber catalyst (10), an injector (20), a lean $NO_x$ trap (30) and an emissions control device (40), which is either a selective catalytic reduction (SCR) catalyst or a selective catalytic reduction filter (SCRF™) catalyst. A second injector (50) may optionally be present. Exhaust gas (1) produced by a lean burn engine is contacted with the $NO_x$ absorber catalyst (10). The exhaust gas (2) from the $NO_x$ absorber catalyst (10) is contacted with the lean $NO_x$ trap (30). The injector (20) may introduce hydrocarbons into the exhaust gas (2) after it has passed through the $NO_x$ absorber catalyst (10). The exhaust gas (3) from the lean $NO_x$ trap (30) is contacted with the emissions control device (40). When present, the injector (50) may introduce a nitrogenous reductant into the exhaust gas (3) after it has passed through the lean $NO_x$ trap (30).

DETAILED DESCRIPTION OF THE INVENTION

Figure 1:
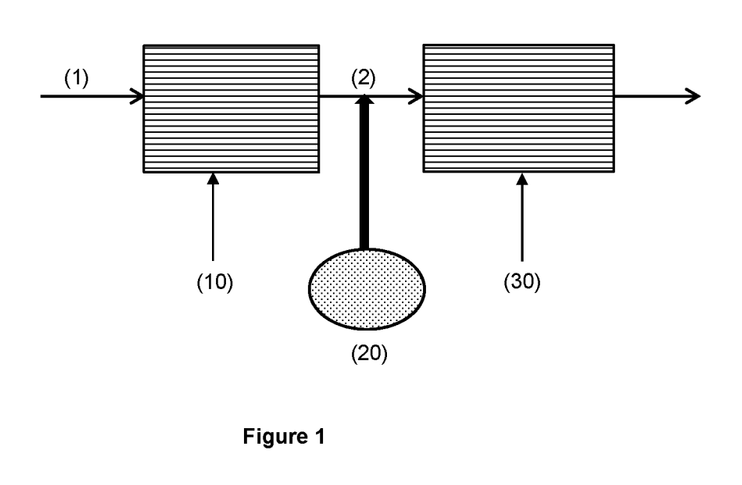
FIGS. 1 and 2 are general representations of exhaust systems in accordance with the invention. In each of the Figures, the left hand side represents an inlet end of the substrate and the right hand side represents an outlet end of the substrate.
Figure 2:
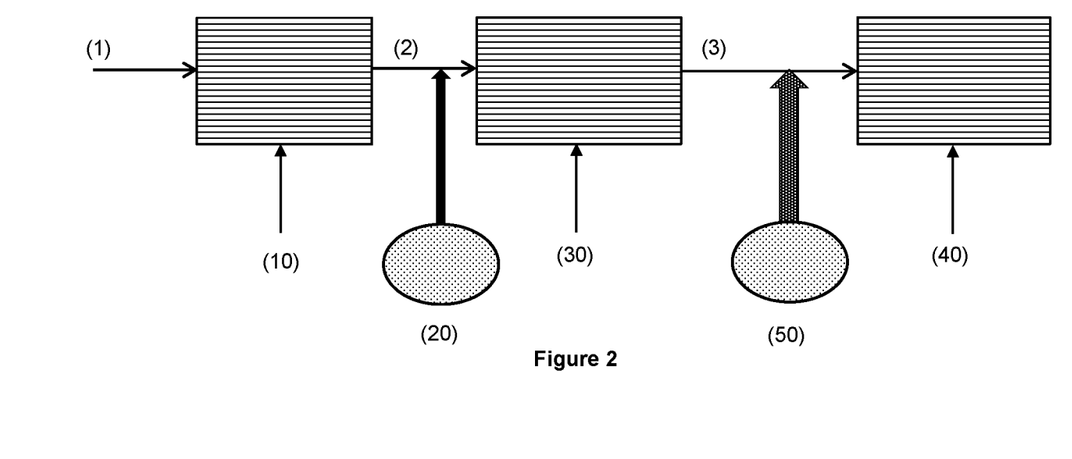

The present invention will now be further described. The following sections relate to different parts of the exhaust system and define each part in more detail. Each part or aspect of invention so defined may be combined with any other part or aspect of the invention unless clearly indicated to the contrary. In particular, any feature indicated as being preferred or advantageous may be combined with any other feature or features indicated as being preferred or advantageous.

$NO_x$ Absorber Catalyst

The $NO_x$ absorber catalyst in the exhaust system of the invention is for use as a passive $NO_x$ absorber (PNA).

The $NO_x$ absorber catalyst comprises, or may consist essentially of, a molecular sieve catalyst comprising a noble metal and a molecular sieve, wherein the molecular sieve contains the noble metal; and a substrate having an inlet end and an outlet end.

The molecular sieve catalyst comprises a noble metal and a molecular sieve. The molecular sieve catalyst is a passive $NO_x$ absorber (PNA) catalyst (i.e. it has PNA activity). The molecular sieve catalyst can be prepared according to the method described in WO 2012/166868.

The noble metal is typically selected from the group consisting of palladium (Pd), platinum (Pt), rhodium (Rh), gold (Au), silver (Ag), iridium (Ir), ruthenium (Ru) and mixtures of two or more thereof. Preferably, the noble metal is selected from the group consisting of palladium (Pd), platinum (Pt) and rhodium (Rh). More preferably, the noble metal is selected from palladium (Pd), platinum (Pt) and a mixture thereof.

Generally, it is preferred that the noble metal comprises, or consists of, palladium (Pd) and optionally a second metal selected from the group consisting of platinum (Pt), rhodium (Rh), gold (Au), silver (Ag), iridium (Ir) and ruthenium (Ru). Preferably, the noble metal comprises, or consists of, palladium (Pd) and optionally a second metal selected from the group consisting of platinum (Pt) and rhodium (Rh). Even more preferably, the noble metal comprises, or consists of, palladium (Pd) and optionally platinum (Pt). More preferably, the molecular sieve catalyst comprises palladium as the only noble metal.

When the noble metal comprises, or consists of, palladium (Pd) and a second metal, then the ratio by mass of palladium (Pd) to the second metal is >1:1. More preferably, the ratio by mass of palladium (Pd) to the second metal is >1:1 and the molar ratio of palladium (Pd) to the second metal is >1:1.

The molecular sieve catalyst may further comprise a base metal. Thus, the molecular sieve catalyst may comprise, or consist essentially of, a noble metal, a molecular sieve and optionally a base metal. The molecular sieve contains the noble metal and optionally the base metal.

The base metal may be selected from the group consisting of iron (Fe), copper (Cu), manganese (Mn), chromium (Cr), cobalt (Co), nickel (Ni), zinc (Zn) and tin (Sn), as well as mixtures of two or more thereof. It is preferred that the base metal is selected from the group consisting of iron, copper and cobalt, more preferably iron and copper. Even more preferably, the base metal is iron.

Alternatively, the molecular sieve catalyst may be substantially free of a base metal, such as a base metal selected from the group consisting of iron (Fe), copper (Cu), manganese (Mn), chromium (Cr), cobalt (Co), nickel (Ni), zinc (Zn) and tin (Sn), as well as mixtures of two or more thereof. Thus, the molecular sieve catalyst may not comprise a base metal.

In general, it is preferred that the molecular sieve catalyst does not comprise a base metal.

It may be preferable that the molecular sieve catalyst is substantially free of barium (Ba), more preferably the molecular sieve catalyst is substantially free of an alkaline earth metal. Thus, the molecular sieve catalyst may not comprise barium, preferably the molecular sieve catalyst does not comprise an alkaline earth metal.

The molecular sieve is typically composed of aluminium, silicon, and/or phosphorus. The molecular sieve generally has a three-dimensional arrangement (e.g. framework) of $SiO_4$, $AlO_4$, and/or $PO_4$ that are joined by the sharing of oxygen atoms. The molecular sieve may have an anionic framework. The charge of the anionic framework may be counterbalanced by cations, such as by cations of alkali and/or alkaline earth elements (e.g., Na, K, Mg, Ca, Sr, and Ba), ammonium cations and/or protons.

Typically, the molecular sieve has an aluminosilicate framework, an aluminophosphate framework or a silico-aluminophosphate framework. The molecular sieve may have an aluminosilicate framework or an aluminophosphate framework. It is preferred that the molecular sieve has an aluminosilicate framework or a silico-aluminophosphate framework. More preferably, the molecular sieve has an aluminosilicate framework.

When the molecular sieve has an aluminosilicate framework, then the molecular sieve is preferably a zeolite.

The molecular sieve contains the noble metal. The noble metal is typically supported on the molecular sieve. For example, the noble metal may be loaded onto and supported on the molecular sieve, such as by ion-exchange. Thus, the molecular sieve catalyst may comprise, or consist essentially of, a noble metal and a molecular sieve, wherein the molecular sieve contains the noble metal and wherein the noble metal is loaded onto and/or supported on the molecular sieve by ion exchange.

In general, the molecular sieve may be a metal-substituted molecular sieve (e.g. metal-substituted molecular sieve having an aluminosilicate or an aluminophosphate framework). The metal of the metal-substituted molecular sieve may be the noble metal (e.g. the molecular sieve is a noble metal substituted molecular sieve). Thus, the molecular sieve containing the noble metal may be a noble metal substituted molecular sieve. When the molecular sieve catalyst comprises a base metal, then the molecular sieve may be a noble and base metal-substituted molecular sieve. For the avoidance of doubt, the term "metal-substituted" embraces the term "ion-exchanged".

The molecular sieve catalyst generally has at least 1% by weight (i.e. of the amount of noble metal of the molecular sieve catalyst) of the noble metal located inside pores of the molecular sieve, preferably at least 5% by weight, more preferably at least 10% by weight, such as at least 25% by weight, even more preferably at least 50% by weight.

The molecular sieve may be selected from a small pore molecular sieve (i.e. a molecular sieve having a maximum ring size of eight tetrahedral atoms), a medium pore molecular sieve (i.e. a molecular sieve having a maximum ring size of ten tetrahedral atoms) and a large pore molecular sieve (i.e. a molecular sieve having a maximum ring size of twelve tetrahedral atoms). More preferably, the molecular sieve is selected from a small pore molecular sieve and a medium pore molecular sieve.

In a first molecular sieve catalyst embodiment, the molecular sieve is a small pore molecular sieve. The small pore molecular sieve preferably has a Framework Type selected from the group consisting of ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG and ZON, as well as a mixture or intergrowth of any two or more thereof. The intergrowth is preferably selected from KFI-SIV, ITE-RTH, AEW-UEI, AEI-CHA, and AEI-SAV. More preferably, the small pore molecular sieve has a Framework Type that is AEI, CHA or an AEI-CHA intergrowth. Even more preferably, the small pore molecular sieve has a Framework Type that is AEI or CHA, particularly AEI.

Preferably, the small pore molecular sieve has an aluminosilicate framework or a silico-aluminophosphate framework. More preferably, the small pore molecular sieve has an aluminosilicate framework (i.e. the molecular sieve is a zeolite), especially when the small pore molecular sieve has a Framework Type that is AEI, CHA or an AEI-CHA intergrowth, particularly AEI or CHA.

In a second molecular sieve catalyst embodiment, the molecular sieve has a Framework Type selected from the group consisting of AEI, MFI, EMT, ERI, MOR, FER, BEA, FAU, CHA, LEV, MWW, CON and EUO, as well as mixtures of any two or more thereof.

In a third molecular sieve catalyst embodiment, the molecular sieve is a medium pore molecular sieve. The medium pore molecular sieve preferably has a Framework Type selected from the group consisting of MFI, FER, MWW and EUO, more preferably MFI.

In a fourth molecular sieve catalyst embodiment, the molecular sieve is a large pore molecular sieve. The large pore molecular sieve preferably has a Framework Type selected from the group consisting of CON, BEA, FAU, MOR and EMT, more preferably BEA.

In each of the first to fourth molecular sieve catalyst embodiments, the molecular sieve preferably has an aluminosilicate framework (e.g. the molecular sieve is a zeolite).

Each of the aforementioned three-letter codes represents a framework type in accordance with the "IUPAC Commission on Zeolite Nomenclature" and/or the "Structure Commission of the International Zeolite Association".

In any one of the first to fourth molecular sieve catalyst embodiments, it may generally be preferred that the molecular sieve (e.g. large pore, medium pore or small pore) has a framework that is not an intergrowth of at least two different Framework Types.

The molecular sieve typically has a silica to alumina molar ratio (SAR) of 10 to 200 (e.g. 10 to 40), such as 10 to 100, more preferably 15 to 80 (e.g. 15 to 30). The SAR generally relates to a molecular having an aluminosilicate framework (e.g. a zeolite) or a silico-aluminophosphate framework, preferably an aluminosilicate framework (e.g. a zeolite).

The molecular sieve catalyst of the first, third and fourth molecular sieve catalyst embodiments (and also for some of the Framework Types of the second molecular sieve catalyst embodiment), particularly when the molecular sieve is a zeolite, may have an infrared spectrum having a characteristic absorption peak in a range of from 750 cm$^{-1}$ to 1050 cm$^{-1}$ (in addition to the absorption peaks for the molecular sieve itself). Preferably, the characteristic absorption peak is in the range of from 800 cm$^{-1}$ to 1000 cm$^{-1}$, more preferably in the range of from 850 cm$^{-1}$ to 975 cm$^{-1}$.

The molecular sieve catalyst of the first molecular sieve catalyst embodiment has been found to have advantageous passive NO$_x$ adsorber (PNA) activity. The molecular sieve catalyst can be used to store NO$_x$ when exhaust gas temperatures are relatively cool, such as shortly after start-up of a lean burn engine. NO$_x$ storage by the molecular sieve catalyst occurs at low temperatures (e.g. less than 200° C.). As the lean burn engine warms up, the exhaust gas temperature increases and the temperature of the molecular sieve catalyst will also increase. The molecular sieve catalyst will release adsorbed NO$_x$ at these higher temperatures (e.g. 200° C. or above).

It has also been unexpectedly found that the molecular sieve catalyst, particularly the molecular sieve catalyst of the second molecular sieve catalyst embodiment has cold start catalyst activity. Such activity can reduce emissions during the cold start period by adsorbing NO$_x$ and hydrocarbons (HCs) at relatively low exhaust gas temperatures (e.g. less than 200° C.). Adsorbed NO$_x$ and/or HCs can be released when the temperature of the molecular sieve catalyst is close to or above the effective temperature of the other catalyst components or emissions control devices for oxidising NO and/or HCs.

The NO$_x$ absorber catalyst preferably does not comprise an oxygen storage material, particularly an oxygen storage material that comprises, or consists essentially of, an oxide of cerium (e.g. CeO$_2$) and/or a manganese compound, which manganese compound comprises, or consists of, an oxide of manganese (e.g. MnO, Mn$_2$O$_3$, MnO.Mn$_2$O$_3$ [sometimes written as Mn$_3$O$_4$] and/or MnO$_2$) or manganese aluminate (MnAl$_2$O$_4$).

For the avoidance of doubt, the NO$_x$ absorber catalyst is not a lean NO$_x$ trap.

Typically, the NO$_x$ absorber catalyst is substantially free of rhodium and/or a NO$_x$ storage component comprising, or consisting essentially of, an oxide, a carbonate or a hydroxide of an alkali metal, an alkaline earth metal and/or a rare earth metal. More preferably, the NO$_x$ absorber catalyst does not comprise rhodium and/or a NO$_x$ storage component comprising, or consisting essentially of, an oxide, a carbonate or a hydroxide of an alkali metal, an alkaline earth metal and/or a rare earth metal.

It may preferable that the $NO_x$ absorber catalyst is substantially free of platinum. More preferably, the $NO_x$ absorber catalyst does not comprise platinum.

The $NO_x$ absorber catalyst preferably does not comprise a SCR catalyst (e.g. a region comprising a SCR catalyst), particularly a SCR catalyst comprising a metal selected from the group consisting of cerium (Ce), chromium (Cr), cobalt (Co), copper (Cu), iron (Fe), manganese (Mn), molybdenum (Mo), nickel (Ni), tungsten (W), vanadium (V) or a combination of any two or more thereof.

Generally, the $NO_x$ absorber catalyst comprises a total loading of noble metal (i.e. of the molecular sieve catalyst, particularly in the first region) of $\geq 1$ g ft$^{-3}$, preferably $>1$ g ft$^{-3}$, and more preferably $>2$ g ft$^{-3}$.

The $NO_x$ absorber catalyst, preferably the first region of the $NO_x$ absorber catalyst, typically comprises a total loading of noble metal (i.e. of the molecular sieve catalyst, particularly in the first region) of 1 to 250 g ft$^{-3}$, preferably 5 to 150 g ft$^{-3}$, more preferably 10 to 100 g ft$^{-3}$. The amount of noble metal in the molecular sieve catalyst can affect its $NO_x$ storage activity.

The $NO_x$ absorber catalyst may contain catalytic materials to provide additional functionality, such as functionality for oxidising carbon monoxide (CO) and/or unburned hydrocarbons (HCs).

In general, the $NO_x$ absorber catalyst may comprise a first region comprising the molecular sieve catalyst, and a second region comprising a platinum group metal (PGM) and a support material. The support material is typically a non-zeolite support material.

The $NO_x$ absorber catalyst of the invention may comprise a second region for oxidising carbon monoxide (CO) and/or hydrocarbons (HCs) and/or nitric oxide (NO). For the avoidance of doubt, the first region is different (i.e. different composition) to the second region.

The second region comprises, or consists essentially of, a platinum group metal (PGM) and a support material. It is preferred that the platinum group metal (PGM) is selected from the group consisting of platinum, palladium and a combination of platinum and palladium. More preferably, the second region comprises platinum or platinum or a combination of platinum and palladium as the only platinum group metal(s). Thus, the second region preferably does not comprise one or more other platinum group metals, such as ruthenium (Ru), rhodium (Rh), osmium (Os) and/or iridium (Ir).

When the second region comprises platinum and palladium, then the platinum and palladium may be a platinum-palladium alloy, preferably a platinum-palladium bimetallic alloy.

The second region typically has a total loading of PGM of 5 to 300 g ft$^{-3}$. It is preferred that the second region has a total loading of the PGM of 10 to 250 g ft$^{-3}$ (e.g. 75 to 175 g ft$^{-3}$), more preferably 15 to 200 g ft$^{-3}$ (e.g. 50 to 150 g ft$^{-3}$), still more preferably 20 to 150 g ft$^{-3}$.

When the second region comprises platinum and palladium, then typically the second region may comprise a ratio by weight of platinum to palladium of 20:1 to 1:20 (e.g. 15:1 to 1:15), preferably 10:1 to 1:10 (e.g. 7.5:1 to 1:7.5), more preferably 6:1 to 1:6 (e.g. 3:1 to 1:3), and even more preferably 2.5:1 to 1:1.

When the second region comprises platinum and palladium, it is preferred that the second region comprises a total weight of platinum that is greater than or equal to the total weight of palladium (e.g. the ratio of Pt:Pd by weight is $\geq 1:1$).

Thus, the second region may comprise a ratio by weight of platinum to palladium of 20:1 to 1:1 (e.g. 15.1:1 to 1.1:1), more preferably 10:1 to 1.25:1 (e.g. 8:1 to 1.5:1), and still more preferably 6:1 to 2:1.

It is preferred that the second region comprises a total weight of platinum that is greater than the total weight of palladium (e.g. the ratio of Pt:Pd by weight is $>1:1$). The ratio of platinum to palladium by total weight is generally $\geq 2:1$ (e.g. Pt:Pd 1:0 to 2:1), more preferably $\geq 4:1$ (e.g. Pt:Pd 1:0 to 4:1). Advantageous NO oxidation activity can be obtained when the total weight of platinum is greater than or equal to the total weight of palladium in the first region.

Typically, the platinum group metal (PGM) is disposed or supported on the support material. The PGM may be disposed directly onto or is directly supported by the support material (e.g. there is no intervening support material between the PGM and the support material). For example, PGM can be dispersed on the support material.

When the second region comprises platinum and palladium, then the platinum may be disposed or supported on the support material and/or the palladium may be disposed or supported on the support material. It is preferred that both the platinum and the palladium are disposed or supported on the support material (i.e. the same support material is used for both platinum and palladium).

When the second region comprises platinum and palladium, then the second region may comprise a platinum support material (e.g. a support material for supporting platinum) and a palladium support material (e.g. a support material for supporting palladium). The platinum support material is preferably a non-zeolite support material. The palladium support material is preferably a non-zeolite support material.

The second region may therefore comprise, or consist essentially of, platinum, palladium, a platinum support material and a palladium support material. The platinum may be disposed or supported on the platinum support material and the palladium may be disposed or supported on the palladium support material. The platinum support material and the palladium support material are preferably different (e.g. different composition).

It may be preferable that the second region is substantially free of palladium, particularly substantially free of palladium (Pd) disposed or supported on the support material. More preferably, the second region does not comprise palladium, particularly palladium disposed or supported on the support material. The presence of palladium, particularly in a large amount, in the second region can be detrimental to NO oxidation activity.

Typically, the support material comprises, or consists essentially of, a refractory oxide. Refractory oxides suitable for use as a catalytic component of an oxidation catalyst for a lean burn engine are well known in the art.

The refractory oxide is typically selected from the group consisting of alumina, silica, titania, zirconia, and a mixed or composite oxide thereof, such as a mixed or composite oxide of two or more thereof. For example, the refractory oxide may be selected from the group consisting of alumina, silica, titania, zirconia, silica-alumina, titania-alumina, zirconia-alumina, titania-silica, zirconia-silica, zirconia-titania, and alumina-magnesium oxide.

The support material, or the refractory oxide thereof, may optionally be doped (e.g. with a dopant). The dopant may be selected from the group consisting of zirconium (Zr), titanium (Ti), silicon (Si), yttrium (Y), lanthanum (La), praseodymium (Pr), samarium (Sm), neodymium (Nd) and an oxide thereof.

In general, the palladium support material comprises, or consists essentially of, a refractory oxide. The palladium support material, or the refractory oxide thereof, may be a support material or a refractory oxide as herein defined above.

Typically, the platinum support material comprises, or consists essentially of, a refractory oxide. The platinum support material, or the refractory oxide thereof, may be a support material or refractory oxide as herein defined above. When the second region comprises a platinum support material, it is preferred that the platinum support material or the refractory oxide thereof comprises, or consists essentially of, alumina, wherein the alumina is optionally doped with a dopant, such as described above. When the platinum support material comprises alumina doped with a dopant, it is preferred that the dopant comprises, or consists essentially of, silicon, magnesium, cerium, lanthanum or an oxide thereof, more preferably silicon or an oxide thereof.

The second region may comprise an amount of support material (e.g. the total amount of the support material and, when present, platinum support material and palladium support material) of 0.1 to 4.5 g in$^{-3}$ (e.g. 0.25 to 4.2 g in$^{-3}$), preferably 0.3 to 3.8 g in$^{-3}$, still more preferably 0.5 to 3.0 g in$^{-3}$ (1 to 2.75 g in$^{-3}$ or 0.75 to 1.5 g in$^{-3}$), and even more preferably 0.6 to 2.5 g in$^{-3}$ (e.g. 0.75 to 2.3 g in$^{-3}$).

The second region may further comprise a hydrocarbon adsorbent material.

In general, the hydrocarbon adsorbent material may be a zeolite. It is preferred that the zeolite is a medium pore zeolite (e.g. a zeolite having a maximum ring size of ten tetrahedral atoms) or a large pore zeolite (e.g. a zeolite having a maximum ring size of twelve tetrahedral atoms). It may be preferable that the zeolite is not a small pore zeolite (e.g. a zeolite having a maximum ring size of eight tetrahedral atoms).

Examples of suitable zeolites or types of zeolite include faujasite, clinoptilolite, mordenite, silicalite, ferrierite, zeolite X, zeolite Y, ultrastable zeolite Y, AEI zeolite, ZSM-5 zeolite, ZSM-12 zeolite, ZSM-20 zeolite, ZSM-34 zeolite, CHA zeolite, SSZ-3 zeolite, SAPO-5 zeolite, offretite, a beta zeolite or a copper CHA zeolite. The zeolite is preferably ZSM-5, a beta zeolite or a Y zeolite.

When the second region comprises a hydrocarbon adsorbent, the total amount of hydrocarbon adsorbent is 0.05 to 3.00 g in$^{-3}$, particularly 0.10 to 2.00 g in$^{-3}$, more particularly 0.2 to 1.0 g in$^{-3}$. For example, the total amount of hydrocarbon adsorbent may be 0.8 to 1.75 g in$^{-3}$, such as 1.0 to 1.5 g in$^{-3}$.

In some applications, it may generally be preferable that the second region is substantially free of a hydrocarbon adsorbent material, particularly a zeolite. Thus, the second region may not comprise a hydrocarbon adsorbent material.

It may be further preferable that the second region is substantially free of a molecular sieve catalyst, such as the molecular sieve catalyst described herein above. Thus, the second region may not comprise the molecular sieve catalyst.

Additionally or alternatively, the second region may be substantially free of rhodium and/or an alkali metal and/or an alkaline earth metal, particularly an alkali metal and/or an alkaline earth metal disposed or supported on the support material. Thus, the second region may not comprise rhodium and/or an alkali metal and/or an alkaline earth metal, particularly an alkali metal and/or an alkaline earth metal disposed or supported on the support material.

The first region and/or the second region may be disposed or supported on the substrate.

The first region may be disposed directly on to the substrate (i.e. the first region is in contact with a surface of the substrate). The second region may be:

(a) disposed or supported on the first region; and/or
(b) disposed directly on to the substrate [i.e. the second region is in contact with a surface of the substrate]; and/or
(c) in contact with the first region [i.e. the second region is adjacent to, or abuts, the first region].

When the second region is disposed directly on to the substrate, then a part or portion of the second region may be in contact with the first region or the first region and the second region may be separated (e.g. by a gap).

When the second region is disposed or supported on the first region, all or part of the second region is preferably disposed directly on to the first region (i.e. the second region is in contact with a surface of the first region). The second region may be a second layer and the first region may be a first layer.

It may be preferable that only a portion or part of the second region is disposed or supported on the first region. Thus, the second region does not completely overlap or cover the first region.

In addition or as an alternative, the second region may be disposed directly on to the substrate (i.e. the second region is in contact with a surface of the substrate). The first region may be:

(i) disposed or supported on the second region; and/or
(ii) disposed directly on to the substrate [i.e. the first region is in contact with a surface of the substrate]; and/or
(iii) in contact with the second region [i.e. the first region is adjacent to, or abuts, the second region].

When the first region is disposed directly on to the substrate, then a part or portion of the first region may be in contact with the second region or the first region and the second region may be separated (e.g. by a gap).

When the first region is disposed or supported on the second region, all or part of the first region is preferably disposed directly on to the second region (i.e. the first region is in contact with a surface of the second region). The first region may be a first layer and the second region may be a second layer.

In general, the first region may be a first layer or a first zone. When the first region is a first layer, then it is preferred that the first layer extends for an entire length (i.e. substantially an entire length) of the substrate, particularly the entire length of the channels of a substrate monolith. When the first region is a first zone, then typically the first zone has a length of 10 to 90% of the length of the substrate (e.g. 10 to 45%), preferably 15 to 75% of the length of the substrate (e.g. 15 to 40%), more preferably 20 to 70% (e.g. 30 to 65%, such as 25 to 45%) of the length of the substrate, still more preferably 25 to 65% (e.g. 35 to 50%).

The second region may generally be a second layer or a second zone. When the second region is a second layer, then it is preferred that the second layer extends for an entire length (i.e. substantially an entire length) of the substrate, particularly the entire length of the channels of a substrate monolith. When the second region is a second zone, then typically the second zone has a length of 10 to 90% of the length of the substrate (e.g. 10 to 45%), preferably 15 to 75% of the length of the substrate (e.g. 15 to 40%), more preferably 20 to 70% (e.g. 30 to 65%, such as 25 to 45%) of the length of the substrate, still more preferably 25 to 65% (e.g. 35 to 50%).

In a first $NO_x$ absorber catalyst embodiment, the first region is arranged to contact the exhaust gas at or near the outlet end of the substrate and after contact of the exhaust gas with the second region. Such an arrangement may be advantageous when the first region has a low light off temperature for CO and/or HCs, and can be used to generate an exotherm.

There are several $NO_x$ absorber catalyst arrangements that facilitate the contact of the exhaust gas with the first region at an outlet end of the substrate and after the exhaust gas has been in contact with the second region. The first region is arranged or oriented to contact exhaust after it has contacted the second region when it has any one of the first to third $NO_x$ absorber catalyst arrangements.

Typically, the second region is arranged or oriented to contact exhaust gas before the first region. Thus, the second region may be arranged to contact exhaust gas as it enters the $NO_x$ absorber catalyst and the first region may be arranged to contact the exhaust gas as it leaves the $NO_x$ absorber catalyst. The zoned arrangement of the first $NO_x$ absorber catalyst arrangement is particularly advantageous in this respect.

In a first $NO_x$ absorber catalyst arrangement, the second region is disposed or supported upstream of the first zone. Preferably, the first region is a first zone disposed at or near an outlet end of the substrate and the second region is a second zone disposed at or near an inlet end of the substrate.

In a second $NO_x$ absorber catalyst arrangement, the second region is a second layer and the first region is a first zone. The first zone is disposed on the second layer at or near an outlet end of the substrate.

In a third $NO_x$ absorber catalyst arrangement, the second region is a second layer and the first region is a first layer. The second layer is disposed on the first layer.

In a second $NO_x$ absorber catalyst embodiment, the second region is arranged to contact the exhaust gas at or near the outlet end of the substrate and after contact of the exhaust gas with the first region.

The $NO_x$ absorber catalyst of the second oxidation catalyst embodiment may show advantageous oxidative activity, particularly toward NO, when it has an arrangement that facilitates the contact of the exhaust gas with the region containing platinum group metal, particularly platinum (Pt), shortly before the exhaust gas exits the catalyst and after it has been in contact with the region containing the molecular sieve catalyst. In such arrangements of the $NO_x$ absorber catalyst, as the exhaust gas enters the catalyst it first comes into contact with the first region for adsorbing $NO_x$. This is particularly advantageous at relatively low exhaust gas temperatures, such as during the cold start period. After the exhaust gas has passed through or over the first region, it comes into contact with the second region for oxidising NO before it finally passes through the outlet of the $NO_x$ absorber catalyst. When the second region has reached its effective temperature for oxidising NO to $NO_2$, then the NO released by the first region will pass through the second region and be oxidised to $NO_2$.

There are several $NO_x$ absorber catalyst arrangements that facilitate the contact of the exhaust gas with the second region at an outlet end of the substrate and after the exhaust gas has been in contact with the first region. The second region is arranged or oriented to contact exhaust after it has contacted the first region when it has any one of the fourth to sixth oxidation catalyst arrangements.

Typically, the first region is arranged or oriented to contact exhaust gas before the second region. Thus, the first region may be arranged to contact exhaust gas as it enters the $NO_x$ absorber catalyst and the second region may be arranged to contact the exhaust gas as it leaves the $NO_x$ absorber catalyst. The zoned arrangement of the fourth $NO_x$ absorber catalyst arrangement is particularly advantageous in this respect.

In a fourth $NO_x$ absorber catalyst arrangement, the first region is disposed or supported upstream of the second zone. Preferably, the second region is a second zone disposed at or near an outlet end of the substrate and the first region is a first zone disposed at or near an inlet end of the substrate. When the second region comprises manganese, then the oxidation catalyst in this arrangement may show good tolerance to sulfur.

In a fifth $NO_x$ absorber catalyst arrangement, the first region is a first layer and the second region is a second zone. The second zone is disposed on the first layer at or near an outlet end of the substrate.

In a sixth $NO_x$ absorber catalyst arrangement, the first region is a first layer and the second region is a second layer. The second layer is disposed on the first layer.

In the first and fourth $NO_x$ absorber catalyst arrangements, the first zone may adjoin the second zone. Preferably, the first zone is contact with the second zone. When the first zone adjoins the second zone or the first zone is in contact with the second zone, then the first zone and the second zone may be disposed or supported on the substrate as a layer (e.g. a single layer). Thus, a layer (e.g. a single) may be formed on the substrate when the first and second zones adjoin or are in contact with one another. Such an arrangement may avoid problems with back pressure.

The first zone may be separate from the second zone. There may be a gap (e.g. a space) between the first zone and the second zone.

The first zone may overlap the second zone. Thus, an end portion or part of the first zone may be disposed or supported on the second zone. The first zone may completely or partly overlap the second zone. When the first zone overlaps the second zone, it is preferred that first zone only partly overlaps the second zone (i.e. the top, outermost surface of the second zone is not completely covered by the first zone).

Alternatively, the second zone may overlap the first zone. Thus, an end portion or part of the second zone may be disposed or supported on the first zone. The second zone generally only partly overlaps the first zone.

It is preferred that the first zone and the second zone do not substantially overlap.

In the second and fifth $NO_x$ absorber catalyst arrangements, the zone (i.e. the first or second zone) is typically disposed or supported on the layer (i.e. the first or second layer). Preferably the zone is disposed directly on to the layer (i.e. the zone is in contact with a surface of the layer).

When the zone (i.e. the first or second zone) is disposed or supported on the layer (i.e. the first or second layer), it is preferred that the entire length of the zone is disposed or supported on the layer. The length of the zone is less than the length of the layer.

The regions, zones and layers described hereinabove may be prepared using conventional methods for making and applying washcoats onto a substrate are also known in the art (see, for example, our WO 99/47260, WO 2007/077462, WO 2011/080525 and WO 2014/195685).

The $NO_x$ absorber catalyst comprises a substrate. The substrate of the $NO_x$ absorber catalyst (NAC) is referred to herein by the abbreviated expression "NAC substrate". The NAC substrate typically has an inlet end and an outlet end.

The NAC substrate typically has a plurality of channels (e.g. for the exhaust gas to flow through). Generally, the NAC substrate is a ceramic material or a metallic material.

It is preferred that the NAC substrate is made or composed of cordierite ($SiO_2$—$Al_2O_3$—$MgO$), silicon carbide (SiC), Fe—Cr—Al alloy, Ni—Cr—Al alloy, or a stainless steel alloy.

Typically, the NAC substrate is a monolith (also referred to herein as a substrate monolith). Such monoliths are well-known in the art. The substrate monolith may be a flow-through monolith or a filtering monolith.

A flow-through monolith typically comprises a honeycomb monolith (e.g. a metal or ceramic honeycomb monolith) having a plurality of channels extending therethrough, which each channel is open at the inlet end and the outlet end.

A filtering monolith generally comprises a plurality of inlet channels and a plurality of outlet channels, wherein the inlet channels are open at an upstream end (i.e. exhaust gas inlet side) and are plugged or sealed at a downstream end (i.e. exhaust gas outlet side), the outlet channels are plugged or sealed at an upstream end and are open at a downstream end, and wherein each inlet channel is separated from an outlet channel by a porous structure.

When the monolith is a filtering monolith, it is preferred that the filtering monolith is a wall-flow filter. In a wall-flow filter, each inlet channel is alternately separated from an outlet channel by a wall of the porous structure and vice versa. It is preferred that the inlet channels and the outlet channels are arranged in a honeycomb arrangement. When there is a honeycomb arrangement, it is preferred that the channels vertically and laterally adjacent to an inlet channel are plugged at an upstream end and vice versa (i.e. the channels vertically and laterally adjacent to an outlet channel are plugged at a downstream end). When viewed from either end, the alternately plugged and open ends of the channels take on the appearance of a chessboard.

The NAC substrate may be an electrically heatable substrate (i.e. the electrically heatable substrate is an electrically heating substrate, in use). When the NAC substrate is an electrically heatable substrate, the $NO_x$ absorber catalyst comprises an electrical power connection, preferably at least two electrical power connections, more preferably only two electrical power connections. Each electrical power connection may be electrically connected to the electrically heatable substrate and an electrical power source. The $NO_x$ absorber catalyst can be heated by Joule heating, where an electric current through a resistor converts electrical energy into heat energy.

The electrically heatable substrate can be used to release any stored $NO_x$ from the first region. Thus, when the electrically heatable substrate is switched on, the $NO_x$ absorber catalyst will be heated and the temperature of the molecular sieve catalyst can be brought up to its $NO_x$ release temperature. Examples of suitable electrically heatable substrates are described in U.S. Pat. Nos. 4,300,956, 5,146,743 and 6,513,324.

In general, the electrically heatable substrate comprises a metal. The metal may be electrically connected to the electrical power connection or electrical power connections.

Typically, the electrically heatable substrate is an electrically heatable honeycomb substrate. The electrically heatable substrate may be an electrically heating honeycomb substrate, in use.

The electrically heatable substrate may comprise an electrically heatable substrate monolith (e.g. a metal monolith). The monolith may comprise a corrugated metal sheet or foil. The corrugated metal sheet or foil may be rolled, wound or stacked. When the corrugated metal sheet is rolled or wound, then it may be rolled or wound into a coil, a spiral shape or a concentric pattern.

The metal of the electrically heatable substrate, the metal monolith and/or the corrugated metal sheet or foil may comprise an aluminium ferritic steel, such as Fecralloy™.

Means for Introducing Hydrocarbons into the Exhaust Gas

The exhaust system of the invention comprises (ii) means for introducing hydrocarbons (HCs) into the exhaust gas. The term "means for introducing hydrocarbons into the exhaust gas" is synonymous with the term "hydrocarbon introducing means for the exhaust gas". Both terms are referred to herein by the abbreviated expression "HC means". The term "introducing hydrocarbons into the exhaust gas" refers to the additional inclusion of hydrocarbons into the exhaust gas (i.e. in addition to any hydrocarbons that may be present from the lean burn engine).

In general, the HC means is configured to introduce hydrocarbons into the exhaust gas downstream of the $NO_x$ absorber catalyst. It is preferred that the HC means is configured to controllably introduce an amount of hydrocarbon into the exhaust gas downstream of the $NO_x$ absorber catalyst. More preferably, the HC means is configured to controllably introduce an amount of hydrocarbon into the exhaust gas downstream of the $NO_x$ absorber catalyst to regenerate the lean $NO_x$ trap (LNT). Thus, the $NO_x$ absorber catalyst is not exposed to the hydrocarbons that are added to the exhaust gas by the HC means. In principle, any HC means known in the art can be used to provide this function.

The HC means is (e.g. located) downstream of the $NO_x$ absorber catalyst (i.e. the $NO_x$ absorber catalyst is (e.g. located) upstream of the HC means). The HC means is preferably (e.g. located) directly downstream of the $NO_x$ absorber catalyst. Thus, there is no emissions control device or apparatus located between the $NO_x$ absorber catalyst and the HC means (other than the apparatus [e.g. hydrocarbon supply apparatus] described below).

Typically, the $NO_x$ absorber catalyst has an outlet (e.g. the outlet end of the NAC substrate) coupled, preferably fluidly coupled by an exhaust gas conduit, to an inlet of the lean $NO_x$ trap (e.g. the inlet end of the LNT substrate). The HC means is preferably located between the outlet of the $NO_x$ absorber catalyst and the inlet of the lean $NO_x$ trap.

The HC means may be an injector or reformer catalyst for generating hydrocarbons or fuel. Such reformer catalysts are known in the art. It is preferred that the HC means is an injector, preferably an injector suitable for injecting fuel or hydrocarbons into the exhaust gas. More preferably, the injector is configured to controllably inject an amount of fuel or hydrocarbons into the exhaust gas.

When the HC means is an injector, then the HC means is preferably connected to an exhaust gas conduit between the outlet of the $NO_x$ absorber catalyst and the inlet of the lean $NO_x$ trap.

The exhaust system or vehicle of the invention may further comprise a hydrocarbon supply apparatus. The hydrocarbon supply apparatus is preferably connected or coupled to the injector.

The hydrocarbon supply apparatus may comprise a hydrocarbons (HCs) conduit to supply hydrocarbon to the HC means, particularly when the HC means is an injector. The HCs conduit is coupled, preferably fluidly coupled, to an engine or a fuel tank (e.g. the engine or the fuel tank of the vehicle).

The HC means and/or the hydrocarbon supply apparatus may be electronically coupled to an engine management system, particularly when the HC means is an injector and the hydrocarbon supply apparatus comprises a HCs conduit coupled to an engine or a fuel tank, preferably to an engine. The engine management system may be configured to trigger the HC means to inject hydrocarbon into the exhaust gas, preferably to purge or regenerate the lean $NO_x$ trap (LNT).

The exhaust system of the invention may further comprise an exhaust gas sensor. The exhaust gas sensor is preferably disposed downstream of the LNT (e.g. at or after an outlet of the LNT).

Generally, the engine management system is coupled to a sensor in the exhaust system. Such a sensor may be disposed downstream, preferably directly downstream, of the LNT. The sensor may be used to monitor the status of the LNT. The sensor may be a $NO_x$ sensor (e.g. to monitor the $NO_x$ content of the exhaust gas at the outlet of the LNT) or the sensor may be a hydrocarbons (HCs) sensor (e.g. to monitor the content of hydrocarbons (HCs) of the exhaust gas at the outlet of the LNT).

The engine management system may be coupled to both a $NO_x$ sensor and a HCs sensor. It is preferred that both the $NO_x$ sensor and the HCs sensor is disposed downstream, preferably directly downstream, of the LNT.

In general, the hydrocarbon is fuel, preferably diesel fuel. When the hydrocarbon is fuel, such as diesel fuel, it is preferred that the fuel comprises ≤50 ppm of sulfur, more preferably ≤15 ppm of sulfur, such as ≤10 ppm of sulfur, and even more preferably ≤5 ppm of sulfur.

When the HC means is an injector, then the injector may also be coupled to a nitrogenous reductant supply apparatus. The same injector may be used to inject hydrocarbons and a nitrogenous reduction, such as an ammonia precursor.

Lean $NO_x$ Trap (LNT)

The exhaust system of the invention comprises (iii) a lean $NO_x$ trap (LNT). The LNT is (e.g. located) downstream of the $NO_x$ absorber catalyst.

The LNT is typically (e.g. located) downstream, preferably directly downstream, of the HC means (i.e. the LNT is (e.g. located) upstream of the HC means). It is preferred that the LNT is (e.g. located) downstream of both the $NO_x$ absorber catalyst and the HC means. Thus, the LNT is exposed to the hydrocarbons that are added to the exhaust gas by the HC means and to the exhaust gas from the $NO_x$ absorber catalyst.

It is preferred that there is no emissions control device or apparatus located between the HC means and the LNT. Thus, the LNT is exposed to the exhaust gas directly after the hydrocarbons are added to the exhaust gas by the HC means.

Typically, the LNT has an inlet (e.g. the inlet end of the NAC substrate) coupled, preferably fluidly coupled by an exhaust gas conduit, to an outlet of the $NO_x$ absorber catalyst (e.g. the outlet end of the NAC substrate).

In principle, the lean $NO_x$ trap (LNT) may be any lean $NO_x$ trap (LNT) known in the art.

Typically, the LNT comprises a nitrogen oxides ($NO_x$) storage material and a substrate, wherein the nitrogen oxides ($NO_x$) storage material comprises a nitrogen oxides ($NO_x$) storage component. It is preferred that the LNT further comprises at least one platinum group metal (PGM). The at least one platinum group metal (PGM) may be provided by the $NO_x$ treatment material described herein below.

The $NO_x$ storage material comprises, or may consist essentially of, a $NO_x$ storage component on a support material.

The $NO_x$ storage component typically comprises an alkali metal, an alkaline earth metal and/or a rare earth metal. The $NO_x$ storage component generally comprises, or consists essentially of, (i) an oxide, a carbonate or a hydroxide of an alkali metal; (ii) an oxide, a carbonate or a hydroxide of an alkaline earth metal; and/or (iii) an oxide, a carbonate or a hydroxide of a rare earth metal.

When the $NO_x$ storage component comprises an alkali metal (or an oxide, a carbonate or a hydroxide thereof), then preferably the alkali metal is selected from the group consisting of potassium (K), sodium (Na), lithium (Li), caesium (Cs) and a combination of two or more thereof. It is preferred that the alkali metal is potassium (K), sodium (Na) or lithium (Li), more preferably the alkali metal is potassium (K) or sodium (Na), and most preferably the alkali metal is potassium (K).

When the $NO_x$ storage component comprises an alkaline earth metal (or an oxide, a carbonate or a hydroxide thereof), then preferably the alkaline earth metal is selected from the group consisting of magnesium (Mg), calcium (Ca), strontium (Sr), barium (Ba) and a combination of two or more thereof. It is preferred that the alkaline earth metal is calcium (Ca), strontium (Sr), or barium (Ba), more preferably strontium (Sr) or barium (Ba), and most preferably the alkaline earth metal is barium (Ba).

When the $NO_x$ storage component comprises a rare earth metal (or an oxide, a carbonate or a hydroxide thereof), then preferably the rare earth metal is selected from the group consisting of cerium (Ce), lanthanum (La), yttrium (Y) and a combination thereof. More preferably, the rare earth metal is cerium (Ce).

Typically, the $NO_x$ storage component comprises, or consists essentially of, (i) an oxide, a carbonate or a hydroxide of a rare earth metal and/or (ii) an oxide, a carbonate or a hydroxide of an alkaline earth metal. It is preferred that the $NO_x$ storage component comprises, or consists essentially of, an oxide, a carbonate or a hydroxide of an alkaline earth metal.

It is preferred that the $NO_x$ storage component comprises barium (Ba) (e.g. an oxide, a carbonate or a hydroxide of barium (Ba)). More preferably, the $NO_x$ storage component comprises barium (e.g. an oxide, a carbonate or a hydroxide of barium (Ba)) and cerium (e.g. an oxide, a carbonate or a hydroxide of cerium (Ce), preferably ceria).

Typically, the $NO_x$ storage component is disposed or supported on the support material. The $NO_x$ storage component may be disposed directly onto or is directly supported by the support material (e.g. there is no intervening support material between the $NO_x$ storage component and the support material).

The support material generally comprises an oxide of aluminium. Typically, the support material comprises alumina. The alumina may or may not be doped with a dopant. It is to be understood that any reference to "doped" in this context refers to a material where the bulk or host lattice of the alumina is substitution doped or interstitially doped with a dopant. Alumina doped with a dopant can be prepared using methods known in the art.

The alumina may be doped with a dopant selected from the group consisting of silicon (Si), magnesium (Mg), barium (Ba), lanthanum (La), cerium (Ce), titanium (Ti), zirconium (Zr) and a combination of two or more thereof. It is preferred that the dopant is selected from the group consisting of silicon (Si), magnesium (Mg), barium (Ba) and cerium (Ce). More preferably, the dopant is selected from the group consisting of silicon (Si), magnesium (Mg) and barium (Ba). Even more preferably, the dopant is magnesium (Mg).

When the alumina is doped, the total amount of dopant is 0.25 to 5% by weight, preferably 0.5 to 3% by weight (e.g. about 1% by weight) of the alumina.

In general, it is preferred that the support material comprises, or consists essentially of, an oxide of magnesium and aluminium. The oxide of magnesium and aluminium may comprise, or consist essentially of, magnesium aluminate ($MgAl_2O_4$ [e.g. spinel]) and/or a mixed oxide of magnesium oxide (MgO) and aluminium oxide ($Al_2O_3$). A mixed oxide of magnesium oxide and aluminium oxide can be prepared using methods known in the art, such as by using the processes described in U.S. Pat. No. 6,217,837 or DE 19503522 A1.

The mixed oxide of magnesium oxide (MgO) and aluminium oxide ($Al_2O_3$) typically comprises, or consists essentially of, 1.0 to 40.0% by weight of magnesium oxide (based on the total weight of the mixed oxide), such as 1.0 to 30.0% by weight, preferably 5.0 to 28.0% by weight (e.g. 5.0 to 25.0% by weight), more preferably 10.0 to 25.0% by weight of magnesium oxide.

The mixed oxide of magnesium oxide (MgO) and aluminium oxide ($Al_2O_3$) is typically a homogeneous mixed oxide of magnesium oxide (MgO) and aluminium oxide ($Al_2O_3$). In a homogeneous mixed oxide, magnesium ions occupy the positions within the lattice of aluminium ions.

Generally, a support material comprising, or consisting essentially of, a mixed oxide of magnesium oxide (MgO) and aluminium oxide ($Al_2O_3$) is preferred.

The $NO_x$ storage material may further comprise a platinum group metal (PGM). The PGM may be selected from the group consisting of platinum, palladium, rhodium and a combination of any two or more thereof. Preferably, the PGM is selected from platinum, palladium and a combination of platinum and palladium.

When the $NO_x$ storage material comprises a PGM, then generally the PGM is disposed or supported on the support material. The PGM is preferably disposed directly onto or is directly supported by the support material (e.g. there is no intervening support material between the PGM and the support material).

Typically, the LNT further comprises a $NO_x$ treatment material. For the avoidance of doubt, the $NO_x$ treatment material is different (e.g. different composition) to the $NO_x$ storage material. The $NO_x$ treatment material may have (a) $NO_x$ storage activity and/or NO oxidative activity [e.g. under lean conditions]; and/or (b) $NO_x$ reductive activity [e.g. under rich conditions].

The $NO_x$ treatment material comprises, or consists essentially of, a $NO_x$ treatment component.

Typically, the $NO_x$ treatment component (NTC) comprises a support material. The support material of the $NO_x$ treatment component (NTC) is referred to herein as the NTC support material.

The NTC support material comprises, or consists essentially of, ceria, or a mixed or composite oxide of ceria, such as a ceria-zirconia.

When the NTC support material comprises, or consists essentially of, a ceria-zirconia, then the ceria-zirconia may consist essentially of 20 to 95% by weight of ceria and 5 to 80% by weight of zirconia (e.g. 50 to 95% by weight ceria and 5 to 50% by weight zirconia), preferably 35 to 80% by weight of ceria and 20 to 65% by weight zirconia (e.g. 55 to 80% by weight ceria and 20 to 45% by weight zirconia), even more preferably 45 to 75% by weight of ceria and 25 to 55% by weight zirconia.

In general, the $NO_x$ treatment component may comprise a platinum group metal (PGM) and/or a $NO_x$ storage component.

The $NO_x$ treatment component may comprise, or consist essentially of, a platinum group metal (PGM) disposed or supported (e.g. directly disposed or supported) on the first support material. The PGM may be selected from the group consisting of platinum, palladium, rhodium, a combination of platinum and palladium, a combination of platinum and rhodium, a combination of palladium and rhodium, and a combination of platinum, palladium and rhodium. It is preferred that the PGM is selected from the group consisting of palladium, rhodium and a combination of palladium and rhodium.

The PGM (i.e. of the $NO_x$ treatment component) may be rhodium. The PGM may be palladium. Preferably, the PGM is palladium.

Additionally or alternatively, the $NO_x$ treatment component may comprise, or consist essentially of, a $NO_x$ storage component disposed or supported (e.g. directly disposed or supported) on the NTC support material. The $NO_x$ storage component generally comprises, or consists essentially of, (i) an oxide, a carbonate or a hydroxide of an alkali metal; (ii) an oxide, a carbonate or a hydroxide of an alkaline earth metal; and/or (iii) an oxide, a carbonate or a hydroxide of a rare earth metal, preferably a rare earth metal other than cerium (Ce). It is preferred that the $NO_x$ storage component comprises, or consists essentially of, an oxide, a carbonate or a hydroxide of an alkaline earth metal. The alkaline earth metal is preferably barium (Ba).

The LNT generally has a concentration (i.e. total loading) of $NO_x$ storage component of 250 to 1000 g $ft^{-3}$ (e.g. 300 to 950 g $ft^{-3}$), particularly 350 to 900 g $ft^{-3}$ (e.g. 400 to 850 g $ft^{-3}$), more particularly 450 to 800 g $ft^{-3}$.

In general, it is preferred that the LNT comprises a $NO_x$ storage material disposed on the substrate. When the LNT comprises a $NO_x$ treatment material, then preferably the $NO_x$ treatment material is disposed on the substrate.

The substrate of the lean $NO_x$ trap (LNT) is referred to herein by the abbreviated expression "LNT substrate". The LNT substrate typically has an inlet end and an outlet end.

The LNT substrate typically has a plurality of channels (e.g. for the exhaust gas to flow through). Generally, the LNT substrate is a ceramic material or a metallic material.

It is preferred that the LNT substrate is made or composed of cordierite ($SiO_2$—$Al_2O_3$—MgO), silicon carbide (SiC), Fe—Cr—Al alloy, Ni—Cr—Al alloy, or a stainless steel alloy.

Typically, the LNT substrate is a monolith (also referred to herein as a substrate monolith). The substrate monolith may be a flow-through monolith or a filtering monolith.

The flow-through monolith typically comprises a honeycomb monolith (e.g. a metal or ceramic honeycomb monolith) having a plurality of channels extending therethrough, which each channel is open at the inlet end and the outlet end.

The filtering monolith generally comprises a plurality of inlet channels and a plurality of outlet channels, wherein the inlet channels are open at an upstream end (i.e. exhaust gas inlet side) and are plugged or sealed at a downstream end (i.e. exhaust gas outlet side), the outlet channels are plugged or sealed at an upstream end and are open at a downstream end, and wherein each inlet channel is separated from an outlet channel by a porous structure.

When the monolith is a filtering monolith, it is preferred that the filtering monolith is a wall-flow filter. In a wall-flow filter, each inlet channel is alternately separated from an outlet channel by a wall of the porous structure and vice versa. It is preferred that the inlet channels and the outlet channels are arranged in a honeycomb arrangement. When there is a honeycomb arrangement, it is preferred that the channels vertically and laterally adjacent to an inlet channel are plugged at an upstream end and vice versa (i.e. the channels vertically and laterally adjacent to an outlet channel are plugged at a downstream end). When viewed from either end, the alternately plugged and open ends of the channels take on the appearance of a chessboard.

Exhaust System

In the exhaust system of the invention, the $NO_x$ absorber catalyst is upstream of both the means for introducing hydrocarbons into the exhaust gas and the lean $NO_x$ trap.

Typically, the $NO_x$ absorber catalyst is coupled to the exhaust outlet of the lean burn engine. Thus, the first emissions control device with which the exhaust gas is brought into contact is the $NO_x$ absorber catalyst.

The $NO_x$ absorber catalyst is (e.g. located) upstream of the means for introducing hydrocarbons into the exhaust gas (the "HC means") (e.g. the HC means is located after the outlet of the $NO_x$ absorber catalyst). The $NO_x$ absorber catalyst is preferably (e.g. located) directly upstream of the means for introducing hydrocarbons into the exhaust gas.

The HC means is (e.g. located) upstream of the LNT (e.g. the HC means is located before the inlet of the LNT). The HC means is preferably (e.g. located) directly upstream of the LNT.

The exhaust system of the invention may further comprise an emissions control device downstream of the LNT. Examples of an emissions control device include a diesel particulate filter (DPF), a lean $NO_x$ trap (LNT), a lean $NO_x$ catalyst (LNC), a selective catalytic reduction (SCR) catalyst, a diesel oxidation catalyst (DOC), a catalysed soot filter (CSF), a selective catalytic reduction filter (SCRF™) catalyst, an ammonia slip catalyst (ASC) and combinations of two or more thereof. Such emissions control devices are all well known in the art.

In a first exhaust system embodiment of the invention, the exhaust system further comprises a selective catalytic reduction (SCR) catalyst. The selective catalytic reduction (SCR) catalyst is (e.g. located) downstream of the LNT. Thus, for example, an outlet of the LNT is connected, preferably directly connected (e.g. without an intervening emissions control device), to an inlet of the selective catalytic reduction (SCR) catalyst.

There may be a nitrogenous reductant supply apparatus between the LNT and the selective catalytic reduction (SCR) catalyst. The nitrogenous reductant supply apparatus may comprise an injector for injecting a nitrogenous reductant, such as ammonia, or an ammonia precursor, such as urea or ammonium formate, preferably urea, into the exhaust gas downstream of the LNT and upstream of the SCR catalyst. Such an injector may be fluidly linked to a source (e.g. a tank) of a nitrogenous reductant precursor. Valve-controlled dosing of the precursor into the exhaust gas may be regulated by suitably programmed engine management means and closed loop or open loop feedback provided by sensors monitoring the composition of the exhaust gas. Ammonia can also be generated by heating ammonium carbamate (a solid) and the ammonia generated can be injected into the exhaust gas.

Alternatively or in addition to the injector for injecting a nitrogenous reductant, ammonia can be generated in situ (e.g. during rich regeneration of a LNT disposed upstream of the SCR catalyst).

In a second exhaust system embodiment of the invention, the exhaust system further comprises a selective catalytic reduction filter (SCRF™) catalyst. The selective catalytic reduction filter (SCRF™) catalyst is (e.g. located) downstream of the LNT. Thus, for example, an outlet of the LNT is connected, preferably directly connected (e.g. without an intervening emissions control device), to an inlet of the selective catalytic reduction filter (SCRF™) catalyst.

There may be a nitrogenous reductant supply apparatus between the LNT and the selective catalytic reduction filter (SCRF™) catalyst. The nitrogenous reductant supply apparatus may comprise an injector for injecting a nitrogenous reductant, such as ammonia, or an ammonia precursor, such as urea or ammonium formate, preferably urea, into the exhaust gas downstream of the LNT and upstream of the SCRF™ catalyst. Such an injector may be fluidly linked to a source (e.g. a tank) of a nitrogenous reductant precursor. Valve-controlled dosing of the precursor into the exhaust gas may be regulated by suitably programmed engine management means and closed loop or open loop feedback provided by sensors monitoring the composition of the exhaust gas. Ammonia can also be generated by heating ammonium carbamate (a solid) and the ammonia generated can be injected into the exhaust gas.

Alternatively or in addition to the injector for injecting a nitrogenous reductant, ammonia can be generated in situ (e.g. during rich regeneration of a LNT disposed upstream of the SCRF™ catalyst).

In the first or second exhaust system embodiment, the SCR catalyst or the SCRF™ catalyst may comprise a metal selected from the group consisting of at least one of Cu, Hf, La, Au, In, V, lanthanides and Group VIII transition metals (e.g. Fe), wherein the metal is supported on a refractory oxide or molecular sieve. The metal is preferably selected from Ce, Fe, Cu and combinations of any two or more thereof, more preferably the metal is Fe or Cu.

The refractory oxide for the SCR catalyst or the SCRF™ catalyst may be selected from the group consisting of $Al_2O_3$, $TiO_2$, $CeO_2$, $SiO_2$, $ZrO_2$ and mixed oxides containing two or more thereof. The non-zeolite catalyst can also include tungsten oxide (e.g. $V_2O_5/WO_3/TiO_2$, $WO_x/CeZrO_2$, $WO_x/ZrO_2$ or $Fe/WO_x/ZrO_2$).

It is particularly preferred when an SCR catalyst, an SCRF™ catalyst or a washcoat thereof comprises at least one molecular sieve, such as an aluminosilicate zeolite or a SAPO. The at least one molecular sieve can be a small, a medium or a large pore molecular sieve. By "small pore molecular sieve" herein we mean molecular sieves containing a maximum ring size of 8, such as CHA; by "medium pore molecular sieve" herein we mean a molecular sieve containing a maximum ring size of 10, such as ZSM-5; and by "large pore molecular sieve" herein we mean a molecular sieve having a maximum ring size of 12, such as beta. Small pore molecular sieves are potentially advantageous for use in SCR catalysts.

Preferred molecular sieves for an SCR catalyst or an SCRF™ catalyst are synthetic aluminosilicate zeolite molecular sieves selected from the group consisting of AEI, ZSM-5, ZSM-20, ERI including ZSM-34, mordenite, ferrierite, BEA including Beta, Y, CHA, LEV including Nu-3, MCM-22 and EU-1, preferably AEI or CHA, and having a silica-to-alumina ratio of about 10 to about 50, such as about 15 to about 40.

In each of the first and second exhaust system embodiments described hereinabove, an ASC catalyst can be disposed downstream from the SCR catalyst or the SCRF™ catalyst (i.e. as a separate substrate monolith), or more preferably a zone on a downstream or trailing end of the substrate monolith comprising the SCR catalyst can be used as a support for the ASC.

In a third exhaust system embodiment, the LNT substrate is a filtering monolith. More preferably, the NAC substrate is a flow-through monolith.

Vehicle

Another aspect of the invention relates to a vehicle. The vehicle comprises a lean burn engine. The lean burn engine is coupled to an exhaust system of the invention.

Preferably, the lean burn engine is a diesel engine.

The diesel engine may be a homogeneous charge compression ignition (HCCI) engine, a pre-mixed charge compression ignition (PCCI) engine or a low temperature combustion (LTC) engine. It is preferred that the diesel engine is a conventional (i.e. traditional) diesel engine.

It is preferred that the lean burn engine is configured or adapted to run on fuel, preferably diesel fuel, comprises ≤50 ppm of sulfur, more preferably ≤15 ppm of sulfur, such as ≤10 ppm of sulfur, and even more preferably ≤5 ppm of sulfur.

The vehicle may be a light-duty diesel vehicle (LDV), such as defined in US or European legislation. A light-duty diesel vehicle typically has a weight of <2840 kg, more preferably a weight of <2610 kg.

In the US, a light-duty diesel vehicle (LDV) refers to a diesel vehicle having a gross weight of ≤8,500 pounds (US lbs). In Europe, the term light-duty diesel vehicle (LDV) refers to (i) passenger vehicles comprising no more than eight seats in addition to the driver's seat and having a maximum mass not exceeding 5 tonnes, and (ii) vehicles for the carriage of goods having a maximum mass not exceeding 12 tonnes.

Alternatively, the vehicle may be a heavy-duty diesel vehicle (HDV), such as a diesel vehicle having a gross weight of >8,500 pounds (US lbs), as defined in US legislation.

Method

Step (a) of the method of the invention may comprise (a)(i) contacting an exhaust gas produced by the lean burn engine with the $NO_x$ absorber catalyst at a first temperature range to store $NO_x$; and (ii) releasing $NO_x$ from the $NO_x$ absorber catalyst at a second temperature range; wherein the second temperature range is higher the first temperature range (e.g. the midpoint of the second temperature range is higher than the midpoint of the first temperature range).

It is preferable that the second temperature range does not overlap with the first temperature range. There may be a gap between the upper limit of first temperature range and the lower limit of the second temperature range.

Typically, the $NO_x$ absorber catalyst releases $NO_x$ at a temperature greater than 200° C. This is the lower limit of the second temperature range. Preferably, the $NO_x$ absorber catalyst releases $NO_x$ at a temperature of 220° C. or above, such as 230° C. or above, 240° C. or above, 250° C. or above, or 260° C. or above.

The $NO_x$ absorber catalyst typically absorbs or stores $NO_x$ at a temperature of 250° C. or less. This is the upper limit of the first temperature range. Preferably, the $NO_x$ absorber catalyst absorbs or stores $NO_x$ at a temperature of 220° C. or less, such as 200° C. or less, 190° C. or less, 180° C. or less, or 175° C. or less.

The $NO_x$ absorber catalyst may preferentially absorb or store nitric oxide (NO). Thus, any reference to absorbing, storing or releasing $NO_x$ in this context may refer absorbing, storing or releasing nitric oxide (NO). Preferential absorption or storage of NO will decrease the ratio of $NO:NO_2$ in the exhaust gas.

Definitions

The term "region" as used herein refers to an area on a substrate, typically obtained by drying and/or calcining a washcoat. A "region" can, for example, be disposed or supported on a substrate as a "layer" or a "zone". The area or arrangement on a substrate is generally controlled during the process of applying the washcoat to the substrate. The "region" typically has distinct boundaries or edges (i.e. it is possible to distinguish one region from another region using conventional analytical techniques).

Typically, the "region" has a substantially uniform length. The reference to a "substantially uniform length" in this context refers to a length that does not deviate (e.g. the difference between the maximum and minimum length) by more than 10%, preferably does not deviate by more than 5%, more preferably does not deviate by more than 1%, from its mean value.

It is preferable that each "region" has a substantially uniform composition (i.e. there is no substantial difference in the composition of the washcoat when comparing one part of the region with another part of that region). Substantially uniform composition in this context refers to a material (e.g. region) where the difference in composition when comparing one part of the region with another part of the region is 5% or less, usually 2.5% or less, and most commonly 1% or less.

The term "zone" as used herein refers to a region having a length that is less than the total length of the substrate, such as ≤75% of the total length of the substrate. A "zone" typically has a length (i.e. a substantially uniform length) of at least 5% (e.g. ≥5%) of the total length of the substrate.

The total length of a substrate is the distance between its inlet end and its outlet end (e.g. the opposing ends of the substrate).

Any reference to a "zone disposed at an inlet end of the substrate" used herein refers to a zone disposed or supported on a substrate where the zone is nearer to an inlet end of the substrate than the zone is to an outlet end of the substrate. Thus, the midpoint of the zone (i.e. at half its length) is nearer to the inlet end of the substrate than the midpoint is to the outlet end of the substrate. Similarly, any reference to a "zone disposed at an outlet end of the substrate" used herein refers to a zone disposed or supported on a substrate where the zone is nearer to an outlet end of the substrate than the zone is to an inlet end of the substrate. Thus, the midpoint of the zone (i.e. at half its length) is nearer to the outlet end of the substrate than the midpoint is to the inlet end of the substrate.

When the substrate is a wall-flow filter, then generally any reference to a "zone disposed at an inlet end of the substrate" refers to a zone disposed or supported on the substrate that is:
(a) nearer to an inlet end (e.g. open end) of an inlet channel of the substrate than the zone is to a closed end (e.g. blocked or plugged end) of the inlet channel, and/or
(b) nearer to a closed end (e.g. blocked or plugged end) of an outlet channel of the substrate than the zone is to an outlet end (e.g. open end) of the outlet channel.

Thus, the midpoint of the zone (i.e. at half its length) is (a) nearer to an inlet end of an inlet channel of the substrate than the midpoint is to the closed end of the inlet channel, and/or (b) nearer to a closed end of an outlet channel of the substrate than the midpoint is to an outlet end of the outlet channel.

Similarly, any reference to a "zone disposed at an outlet end of the substrate" when the substrate is a wall-flow filter refers to a zone disposed or supported on the substrate that is:

(a) nearer to an outlet end (e.g. an open end) of an outlet channel of the substrate than the zone is to a closed end (e.g. blocked or plugged) of the outlet channel, and/or
(b) nearer to a closed end (e.g. blocked or plugged end) of an inlet channel of the substrate than it is to an inlet end (e.g. an open end) of the inlet channel.

Thus, the midpoint of the zone (i.e. at half its length) is (a) nearer to an outlet end of an outlet channel of the substrate than the midpoint is to the closed end of the outlet channel, and/or (b) nearer to a closed end of an inlet channel of the substrate than the midpoint is to an inlet end of the inlet channel.

A zone may satisfy both (a) and (b) when the washcoat is present in the wall of the wall-flow filter (i.e. the zone is in-wall).

The term "adsorber" as used herein, particularly in the context of a $NO_x$ adsorber, should not be construed as being limited to the storage or trapping of a chemical entity (e.g. $NO_x$) only by means of adsorption. The term "adsorber" used herein is synonymous with "absorber".

The term "mixed oxide" as used herein generally refers to a mixture of oxides in a single phase, as is conventionally known in the art. The term "composite oxide" as used herein generally refers to a composition of oxides having more than one phase, as is conventionally known in the art.

The expression "consist essentially" as used herein limits the scope of a feature to include the specified materials, and any other materials or steps that do not materially affect the basic characteristics of that feature, such as for example minor impurities. The expression "consist essentially of" embraces the expression "consisting of".

The expression "substantially free of" as used herein with reference to a material, typically in the context of the content of a region, a layer or a zone, means that the material in a minor amount, such as ≤5% by weight, preferably ≤2% by weight, more preferably ≤1% by weight. The expression "substantially free of" embraces the expression "does not comprise".

Any reference to an amount of dopant, particularly a total amount, expressed as a % by weight as used herein refers to the weight of the support material or the refractory oxide thereof.

EXAMPLES

The invention will now be illustrated by the following non-limiting example.

Example 1

Pd nitrate was added to a slurry of a small pore zeolite with CHA structure and was stirred. Alumina binder was added and then the slurry was applied to a cordierite flow through monolith having 400 cells per square inch structure using established coating techniques. The coating was dried and calcined at 500° C. A coating containing a Pd-exchanged zeolite was obtained. The Pd loading of this coating was 80 g ft$^{-3}$.

Experimental Results

The catalyst of example 1 was fitted to a 1.6 litre bench mounted diesel engine. The engine was run to perform a simulated World Harmonised Light Duty Test Cycles (WLTC). Emissions were measured pre- and post-catalyst. The $NO_x$ absorbing performance of the catalyst was determined as the difference between the cumulative $NO_x$ emission pre-catalyst compared with the cumulative $NO_x$ emission post-catalyst. The difference between the pre- and post-catalyst cumulative $NO_x$ emissions is attributed to $NO_x$ absorbed by the catalyst. The first tests were run with the catalyst in a fresh condition.

The catalyst of example 1 was then exposed to 30 cycles of lean/rich cycling on the engine. Each cycle comprised 300 seconds lean operation followed by 10 seconds of rich operation at lambda 0.95. The exhaust gas temperature at the catalyst inlet was controlled to 250° C. during the lean operation. The catalyst was then re-assessed for $NO_x$ absorbing performance by running WLTC cycles.

Table 1 below shows the $NO_x$ absorbing performance for the catalyst of example 1 at 500 seconds into the WLTC test in the fresh condition and after exposure to lean/cycle cycles.

TABLE 1

| Example | $NO_x$ absorbed at 500 seconds (g) | |
|---|---|---|
| No. | Fresh condition | After lean/rich exposure |
| 1 | 0.38 | 0.27 |

The catalyst of example 1 shows significant reduction in the amount of $NO_x$ absorbed after exposure to lean/rich cycling (e.g. as encountered when regenerating a LNT).

For the avoidance of any doubt, the entire content of any and all documents cited herein is incorporated by reference into the present application.

The invention claimed is:

1. An exhaust system for treating an exhaust gas produced by a lean burn engine comprising:
   (i) a $NO_x$ absorber catalyst comprising a molecular sieve catalyst disposed on a substrate, wherein the molecular sieve catalyst comprises a noble metal and a molecular sieve, wherein the molecular sieve contains the noble metal;
   (ii) a hydrocarbon introducing means for introducing hydrocarbons into the exhaust gas; and
   (iii) a lean $NO_x$ trap;
   wherein the $NO_x$ absorber catalyst is upstream of both the means for introducing hydrocarbons into the exhaust gas and the lean $NO_x$ trap; and
   wherein the exhaust system does not comprise a hydrocarbon introducing means upstream of the $NO_x$ absorber catalyst.

2. The exhaust system of claim 1, wherein the noble metal comprises palladium.

3. The exhaust system of claim 1, wherein the molecular sieve is a small pore molecular sieve having a Framework Type selected from the group consisting of ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, TSC, UEI, UFI, VNI, YUG, ZON and a mixture or intergrowth of any two or more thereof.

4. The exhaust system of claim 3, wherein the small pore molecular sieve has a Framework Type that is AEI or CHA.

5. The exhaust system of claim 1, wherein the molecular sieve has an aluminosilicate framework and a silica to alumina molar ratio of 10 to 200.

6. The exhaust system of claim 1, wherein the substrate is a flow-through monolith or a filtering monolith.

7. The exhaust system of claim 1, wherein the hydrocarbon introducing means is configured to controllably introduce an amount of hydrocarbon into the exhaust gas downstream of the $NO_x$ absorber catalyst.

8. The exhaust system of claim 1, wherein the hydrocarbon introducing means is an injector.

9. The exhaust system of claim 1, wherein the lean $NO_x$ trap comprises a substrate, which substrate is a flow-through monolith or a filtering monolith.

10. The exhaust system of claim 1 further comprising a selective catalytic reduction (SCR) catalyst, wherein the selective catalytic reduction (SCR) catalyst is downstream of the lean $NO_x$ trap.

11. The exhaust system of claim 10 further comprising a nitrogenous reductant supply apparatus between the lean $NO_x$ trap and the selective catalytic reduction (SCR) catalyst.

12. The exhaust system of claim 1 further comprising a selective catalytic reduction filter, wherein the selective catalytic reduction filter catalyst is downstream of the lean $NO_x$ trap.

13. The exhaust system of claim 12 further comprising a nitrogenous reductant supply apparatus between the lean $NO_x$ trap and the selective catalytic reduction filter catalyst.

14. A vehicle comprising a lean burn engine and the exhaust system of claim 1.

15. A method of treating an exhaust gas from a lean burn engine comprising passing an exhaust gas produced by the lean burn engine through the exhaust system of claim 1.

16. The method of claim 15, wherein the lean burn engine is run on diesel fuel comprising less than or equal to 50 ppm of sulfur.

* * * * *